O. KRAUS.
INTERNAL COMBUSTION ENGINE.
APPLICATION FILED MAY 20, 1910.

1,163,671.

Patented Dec. 14, 1915.
4 SHEETS—SHEET 1.

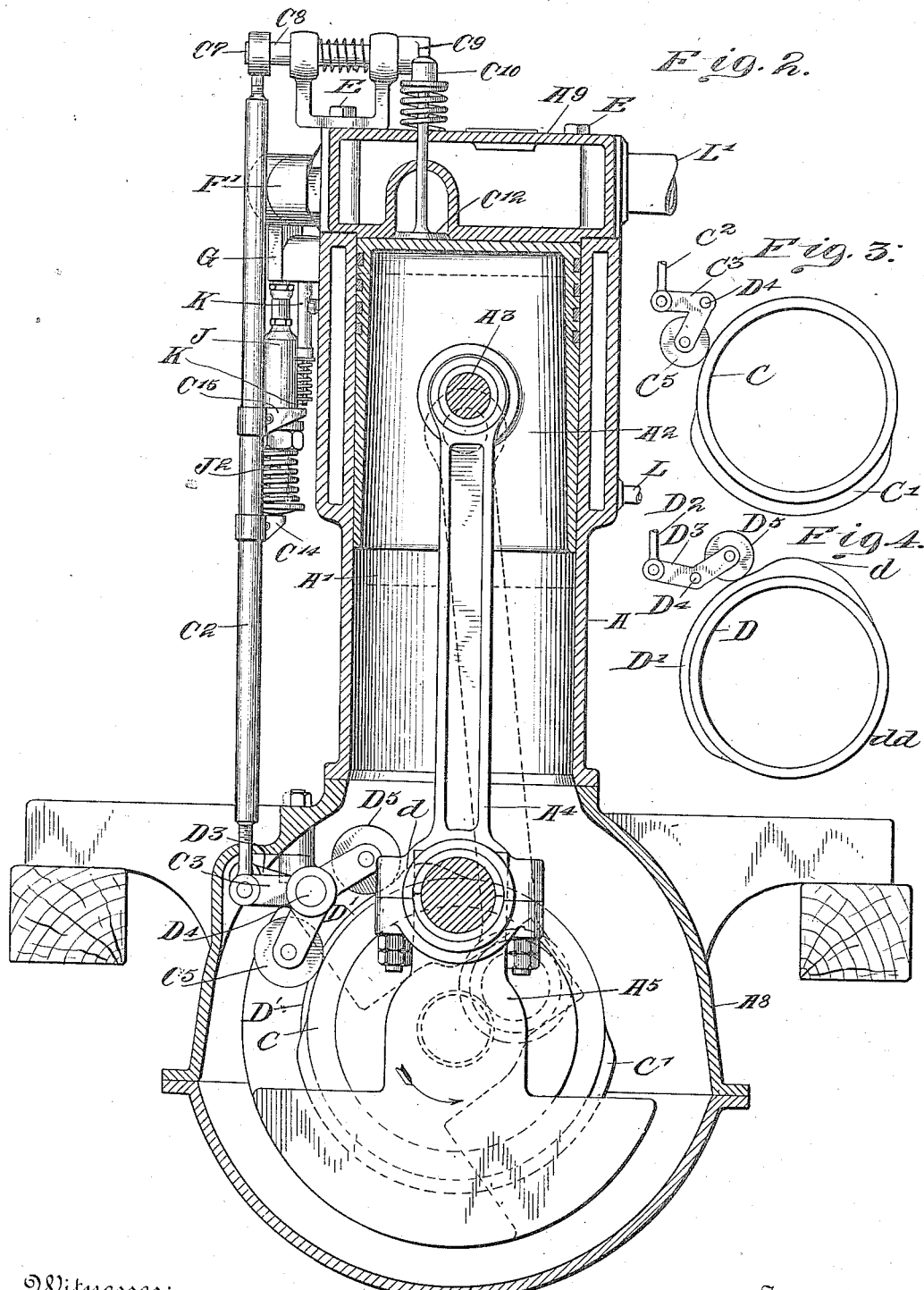

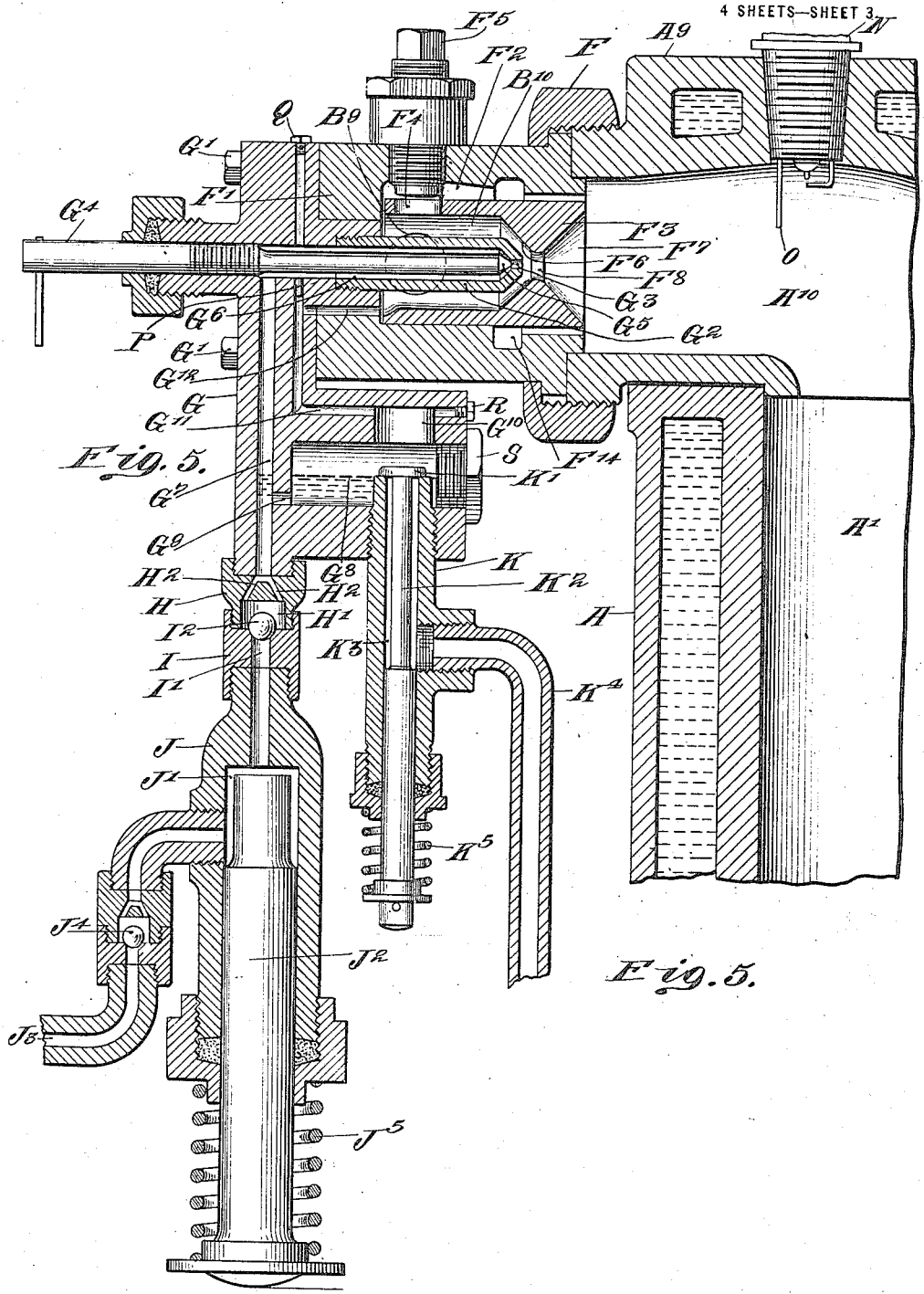

O. KRAUS.
INTERNAL COMBUSTION ENGINE.
APPLICATION FILED MAY 20, 1910.

1,163,671.

Patented Dec. 14, 1915.
4 SHEETS—SHEET 4.

Witnesses:
Inventor
Otto Kraus
By his Attorney

UNITED STATES PATENT OFFICE.

OTTO KRAUS, OF NEW YORK, N. Y.

INTERNAL-COMBUSTION ENGINE.

1,163,671.  Specification of Letters Patent.  Patented Dec. 14, 1915.

Application filed May 20, 1910. Serial No. 562,363.

*To all whom it may concern:*

Be it known that I, OTTO KRAUS, a citizen of the United States, and a resident of New York city, in the county of New York and State of New York, have invented certain new and useful Improvements in Internal-Combustion Engines, of which the following is a specification.

My invention relates to internal combustion engines, and particularly to that type in which oil is sprayed or atomized by means of compressed air.

My invention is constructed to operate with a power stroke for each revolution of the main crank.

The object of my invention is to provide an internal combustion engine in which gasolene, alcohol, kerosene, or fuel oils may be burned with economy.

A further object is to generate a perfect fuel by atomizing fuel oil with air and burning same in an envelop of air, which air is utilized at first to prevent the oil sprayed from reaching the walls of the combustion chamber and then is combined with the oil to further support combustion.

A further object is to provide an engine which will operate by slowly generating and burning the gases in order to avoid a relatively high pressure above that of the compressed charge of fuel.

A further object is to inject all of the fuel after the piston has made its upward or exhaust stroke, necessary for the operation of the engine, and to cause the air to flow from the compressor cylinder with sufficient velocity at all periods when the valve is open which controls communication between said cylinder and power cylinder, to atomize the oil and spray it into the combustion chamber.

A further object is to employ a portion of the exhaust gases to act as a heating medium in which the new charge of sprayed oil and air may be injected to more rapidly heat the combustible mixture, and assist in igniting the same.

A further object is to utilize an air compressing cylinder the piston in which is driven directly from the main shaft in timed relation with the power piston to deliver the air used in generating the combustible mixture into the cylinder during the period that the piston is moving from its highest to about one-fourth of its stroke, at about which point the communication between the power cylinder and the air compressor is closed.

Other objects and advantages of my invention will be disclosed in the following specification and pointed out in the claims forming a part thereof.

Figure 1:
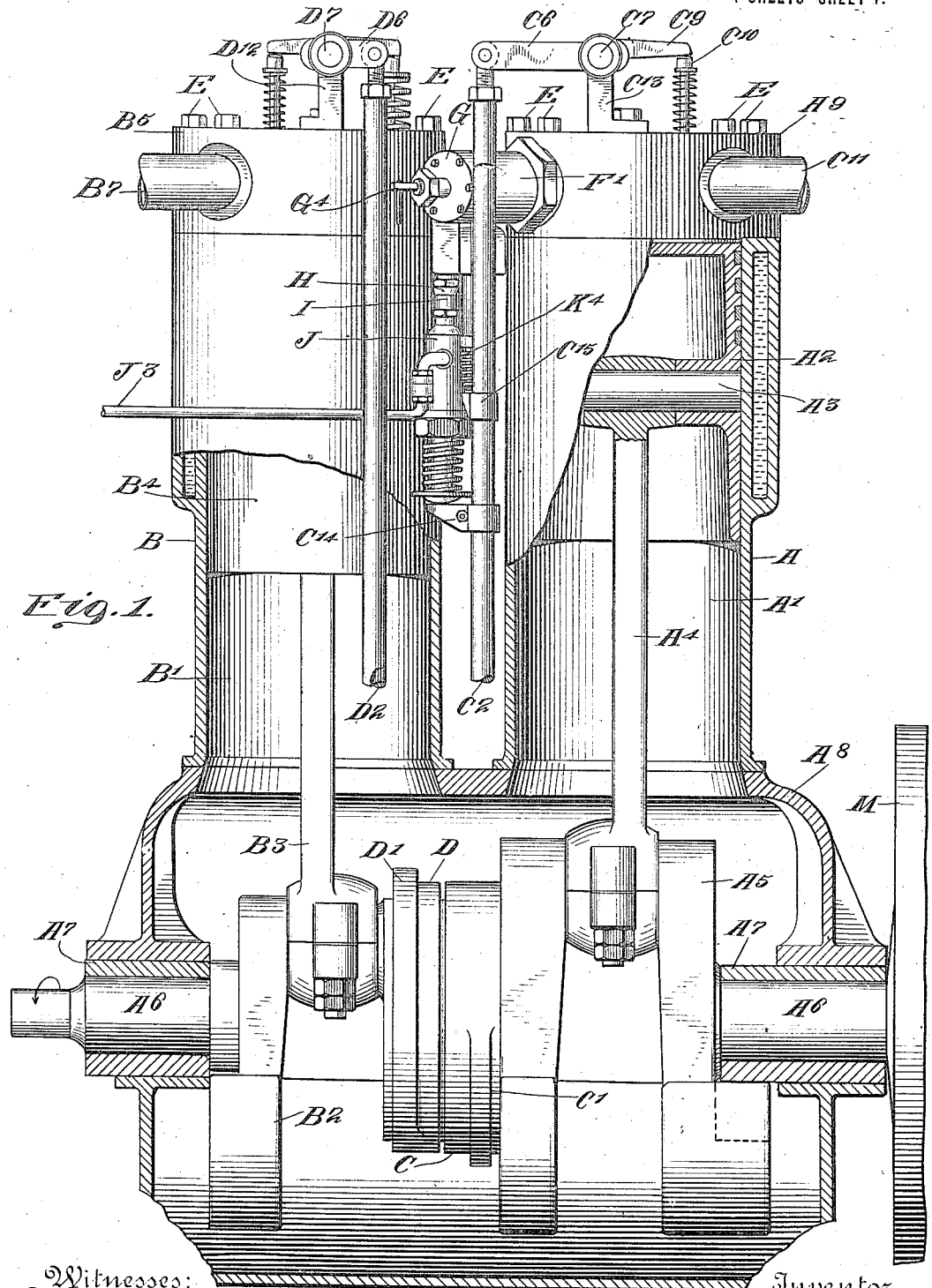
Figure 6:
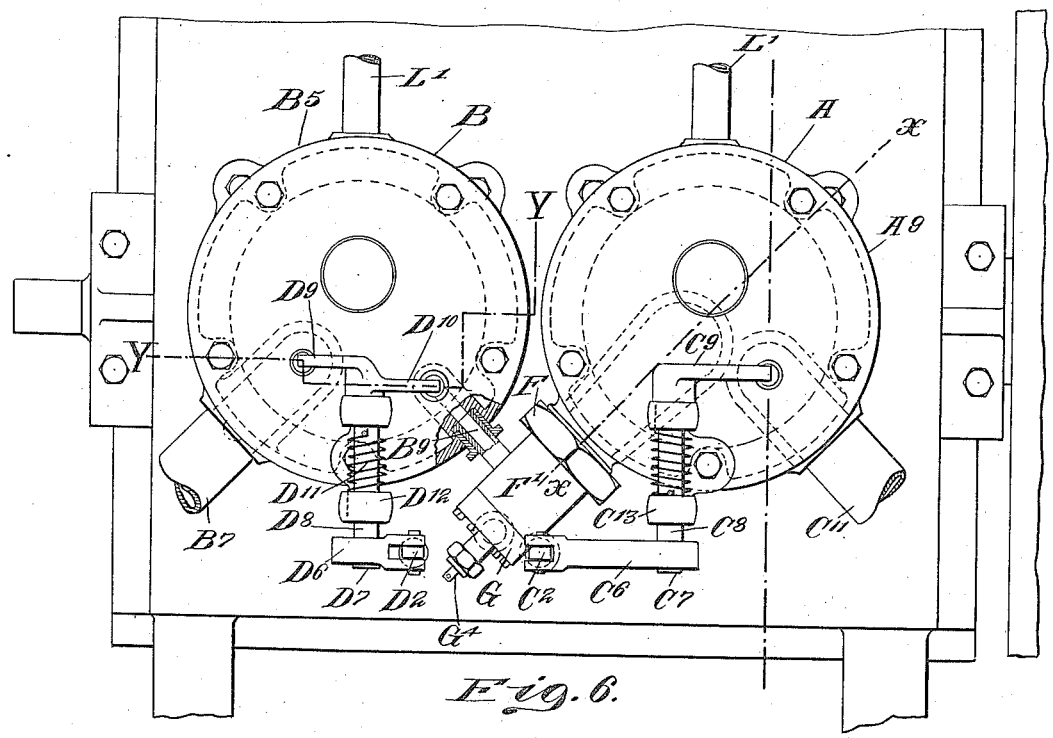
Figure 7:
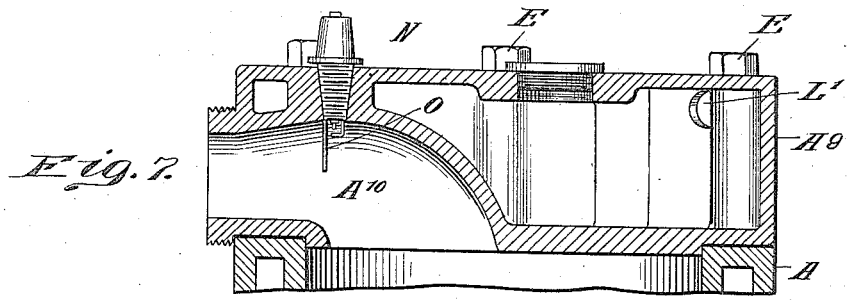
Figure 8:
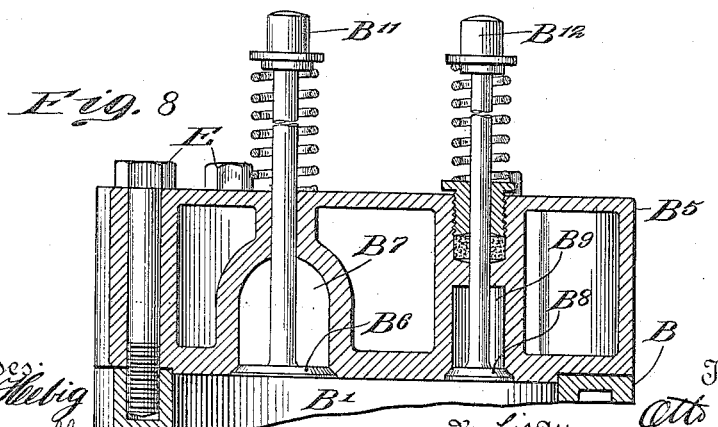

Referring to the drawings which form a part of this specification, Figure 1, discloses a vertical view of an engine embodying my invention, a portion of the walls of which are shown in vertical section. Fig. 2, is a vertical sectional view through the power cylinder of the engine, and discloses the means used for operating the exhaust valve and oil pump. Fig. 3, is a side view of the cam ring which is mounted on the main shaft, and actuates the exhaust valve of the engine. Fig. 4, is a side view of the cam which actuates the rod by means of which the two valves in the top of the air compressor are operated. Fig. 5, is a vertical sectional view taken on line X of Fig. 6, and discloses the construction of the oil pump, spray nozzle and overflow valve, and their general relative arrangement. Fig. 6, is a plan view disclosing the air compressor and power cylinders and the general arrangement of the valve operating levers. Fig. 7, is a fragmentary sectional view taken on line X of Fig. 6, and Fig. 8, is a fragmentary sectional view taken on lines indicated by Y in Fig. 6, and disclosing the two valves located in the top of the air compressor cylinder.

A, indicates the cylinder casing of the power cylinder and B the cylinder casing of the air compressor portion.

A' indicates the power cylinder and B' the cylinder of the air compressor portion. Located in the cylinder A' is a power piston $A^2$ provided with a wrist pin $A^3$. Connected to said wrist pin is a connecting rod $A^4$ the lower end of which is connected to the main crank $A^5$, which is mounted on the main shaft $A^6$ which rests in bearings $A^7$, which in turn are supported by a crank casing $A^8$ the interior of which forms a housing for the cranks $A^5$ and $B^2$, both of which are directly connected to the main shaft $A^6$.

Mounted between the cranks $A^5$ and $B^2$ on a portion of the main shaft $A^6$, which is enlarged in diameter at this point, are two cam rings indicated by C and D respectively, on which are formed cams C' and D' respectively, which operate valve rods $C^2$ and $D^2$ respectively.

Driven by the crank $B^2$ is a connecting rod $B^3$ which actuates the air compressor piston $B^4$. The length of the stroke of the piston $A^2$ is somewhat greater than the length of the stroke of the piston $B^4$, when the cylinders $A'$ and $B'$ are of the same diameter, and the crank pin of the crank $A^5$ is set ahead about 50 degrees in advance of the crank pin of the crank $B^2$ and the engine in operating turns in the direction indicated by the arrow on the crank $A^5$ in Fig. 2. I do not wish to confine myself, however, to the diameter of the air compressor being of the same diameter as that of the power cylinder, since it may be of less or greater diameter, and also the stroke may be of less or greater length than shown, the object being to provide a cylinder of the proper cubic dimensions to properly carry out the function necessary to successful operation.

Bolted on the top of each of the cylinder casings, A and B, are water-jacketed cylinder heads indicated by $A^9$ and $B^5$ respectively, which are secured to the respective casings by bolts E—E—E, etc.

Located in the cylinder head $B^5$ is a valve $B^6$ which controls a passage $B^7$ which leads to the atmosphere, and through which air is drawn into the cylinder $B'$ on the downward stroke of the piston $B^4$. A second valve indicated by $B^8$ is located in the cylinder head $B^5$ and controls a passage $B^9$ (see Fig. 6) which communicates with the annular chamber $B^{10}$ which in turn is in open communication with a curved chamber $A^{10}$ in the cylinder head $A^9$, and the upper end of the cylinder $A'$.

Connected to the cylinder head $A^9$ by a coupling ring F is a plug $F'$, which is provided with a passage $F^2$ which is formed between the inner wall of the plug portion $F'$ and the outer surface of a nozzle element $F^3$, which is fitted within the plug $F'$, which passage terminates in an annular groove $F^{14}$, the outlet of which is contracted in area and is in open communication with the curved chamber $A^{10}$. The chamber $B^{10}$ is formed in the nozzle element $F^3$ and is provided with an opening $F^4$ which may be restricted or closed by the lower end of the set screw $F^5$. The nozzle element $F^3$ is further provided with two cone shaped surfaces indicated by $F^6$ and $F^7$ respectively at the apex of which is provided a passage $F^8$ which establishes communication between the chambers $B^{10}$ and $A^{10}$.

Connected to the plug portion $F'$ by bolts $G'$ is a casing G in one side of which is secured a tube $G^2$ one end of which is formed cone shaped and provided with a passage $G^3$, the axis of which is located in alinement with the passage $F^8$. A valve rod $G^4$ is threaded and screws in the casing G and carries a valve $G^5$ at its inner end which may be adjusted to restrict or close the passage $G^3$.

The chamber $A^{10}$ is of larger diameter than the largest diameter of the annular groove and thus forms an expansion chamber into which the fuel mixture and the surrounding envelop of air may expand. By reason of this free expansion of the mixture and the surrounding air, the latter does not become entirely mixed with the fuel, the outer layers thereof being maintained substantially free from fuel vapor and thus serves to protect the walls of the cylinder from any deposit and also cools the same. In this mode of operation, the molecules of oxygen in the air are taken up and burned and the molecules of nitrogen are left at the exterior of the burning mixture, affording an inert envelop immediately adjacent the cylinder walls to protect the same from the burning gases. It will be noted also that as the fuel mixture leaves the nozzle, it is thrown out radially to a certain extent, but as the surrounding air envelop can expand, the outer layer thereof is not mixed with the fuel but is maintained free from the vapor as above explained.

The inner end of the valve rod $G^4$ is of less diameter than the inner diameter of the tube $G^2$, so that an annular passage $G^6$ is formed, which communicates with a vertical passage $G^7$ which extends to the bottom of the casing G. Formed in the casing G is a chamber $G^8$, which is in open communication with the passage $G^7$ through a passage $G^9$. The chamber $G^8$ is also in communication with the annular chamber $B^{10}$ through the passages $G^{10}$, $G^{11}$, and $G^{12}$ respectively.

Connected to the lower end of the casing G is a valve housing H to the lower end of which is connected a casting I having a passage $I'$, the upper end of which is normally closed by a ball check valve $I^2$ which rests in a chamber $H'$ formed in the casting H. Two small passages indicated by $H^2$ establish communication between the chamber $H'$ and the passage $G^7$.

Connected to the bottom of the casting I is a pump cylinder casing J provided with a cylinder $J'$ in which is fitted a piston plunger $J^2$ by means of which oil may be drawn into the passage $J^3$ past the check valve $J^4$ and forced upward past the ball check valve $I^2$ and into the chamber $G^8$ by way of the passage $G^9$.

Screwed in to the under side of the casing G is a casing K, the upper end of which extends upward from the bottom of the chamber $G^8$ a predetermined distance, and is formed as a valve seat for the valve $K'$ which is provided with the valve stem $K^2$, the upper end of which is reduced in diameter to permit oil to flow from the chamber $G^8$ through the annular passage K³ to the pipe K⁴ and through same back to the oil tank from which the oil was originally pumped by means of the plunger J².

A spring K⁵ is provided to keep the valve K' normally seated and a spring J⁵ is provided to move the plunger J² from its upper to its lower position when the plunger operating means is lowered, as will be readily understood.

The means used for operating the valve rods C² and D² respectively, comprise bell-crank levers C³ and D³ respectively, which are supported on a short shaft D⁴ screwed into the side of the casing A⁸, one end of said bell-crank levers C³ and D³ being connected respectively to the valve rods C² and D² respectively, and their opposite ends being provided with rollers C⁵ and D⁵ respectively.

The exhaust valve is operated through the instrumentality of the cam C', the cam wheel C⁵ and the lever C³ and rod C² and the lever C⁶ which is fulcrumed at C⁷, on a short shaft C⁸ which carries a lever C⁹, the end of which operates the valve rod C¹⁰, the lower end of which carries the exhaust valve C¹² to exhaust the gases from the cylinder through the exhaust pipe C¹¹ as will be readily understood.

Through the instrumentality of the cams D' and d, which last is indicated in dotted lines in Fig. 2, and the cam roller D⁵, lever D³, valve rod D², a lever D⁶ which is fulcrumed at D⁷ by means of a cross shaft D⁸ and the oppositely disposed levers D⁹ and D¹⁰, the valves B⁶ and B⁸ are operated, and since the end of the lever D⁹ rests on the end of the valve stem B¹¹ and the end of the lever D¹⁰ rests on the top of the valve stem B¹², the cams act to alternately open said valves by the means shown.

A helical spring indicated by D¹¹ is mounted on the short shaft D⁸ and one end is made fast to a pin connected to the shaft and the opposite end is made fast to the pillar post D¹² after it has been placed under a strain, so that the action of the spring will assist in holding the roller D⁵ in contact with the cam D'. A similar pillar post indicated by C¹³ is mounted on the top of the cylinder head A⁹ to support the short shaft C⁸, and a similar spring is mounted on the shaft C⁸, the tension of said spring serving to depress the valve rod C² and hold the cam wheel C⁵ firmly in contact with the cam C'.

Mounted on the valve rod C² are two brackets located one above the other and indicated by C¹⁴ and C¹⁵ respectively; the bracket C¹⁴ being located beneath the lower end of the oil pump plunger J² and adapted to lift said plunger to pump oil to the chamber G⁸ and the bracket C¹⁵ being located directly below the valve rod K² and serving to lift the same to permit oil to flow from the chamber G⁸ through the passage K³ and pipe K back to the oil tank.

The cylinders of the engine are water jacketed, the inlet of one being indicated by L in Fig. 2, and the outlet by L'. The engine is provided with the usual fly wheel indicated by M.

Mounted in the chamber A¹⁰ which will hereinafter be referred to as the combustion chamber of the engine is a spark plug indicated by N and connected to the lower end of the spark plug is a platinum wire indicated by O, the purpose of which is to ignite the fuel after the engine has been running a short time.

Small plugs P, Q, R and S, respectively, are used to close the ends of drilled passages, as shown.

The construction of the engine is so clearly illustrated by the drawings that further description of its parts is deemed unnecessary.

The operation of the engine is as follows: Assuming the engine to be cold, in the first instance, the balance wheel M being used to impart motion to the cranks and pistons, and the valve G⁵ controlling the oil spray to be properly adjusted; the wheel M is rotated which starts the piston B⁴ on its upward movement, thereby compressing air in the cylinder B' above said piston, and when the cam D' operates to open the valve B⁸, the air passes through the passage B⁹ (which is made of as small cubic capacity as possible consistent with its function) into chamber B¹⁰ and therefrom by three separate passages, one leading through passage F⁸ into the combustion chamber A¹⁰, and serving to draw oil from chamber G⁶ and spray same into the combustion chamber; one passing through passages G¹⁰, G¹¹, and G¹² and acting on the surface of oil therein to force oil therefrom through passages G⁹, G⁷, G⁶ and G³; and one passing through the opening F⁴ and passage F² to the annular chamber F¹⁴ and its restricted annular outlet into the combustion chamber, forming an annular envelop of air for the fuel issuing from the nozzle, and serving to prevent the atomized oil from being projected in contact with the walls of the combustion chamber, the object being to ignite the fuel within an envelop of air and to continuously inject and burn same during the period that the air compressor piston is traveling upward after the valve B⁸ is opened, and to open said valve when the piston A² is about to begin its power stroke. The relative amounts of air passing through the nozzle direct, and that passing through the annular outlet to form the envelop, is controlled by the set screw F⁵. By closing the opening F⁴, practically all of the air will be forced out through the passage F⁸, and when the engine is operated with said passage F⁴ closed, it is obvious that no air envelop is formed. The amount of oil sprayed is controlled by the valve G⁵, as will be readily understood.

It is obvious that if the oil and air forming the fuel, is injected continuously during a certain period of the upward stroke of the air compressor piston B⁴, that said fuel will be continuously fed to the cylinder A′ during a corresponding downward movement of the piston A², and therefore, the combustion will be continuous during this period so that the highest pressure generated in the combustion chamber will always be as low or lower than the air pressure generated in the air compressor. The piston in the air compressor is traveling upward at the same time that the power piston is traveling downward, and all of the air in the compressor must flow to the combustion chamber, and with sufficient velocity to spray the oil at all times during its flow.

It will be noticed that the power piston A² travels to the extreme top of the cylinder A′, and also that the compressor piston also travels to the top of cylinder B′, and that every downward stroke of the power piston is a power stroke, the exhaust valve C¹² being opened to exhaust the burned gases just before the power piston completes its stroke, and closes just before the said piston completes its upward stroke and preferably in time to trap a portion of the burned gases and compress same into the combustion chamber in order that the incoming fuel may be atomized and projected into said hot gases to assist in gasifying and igniting same, a spark being generated by the spark plug N at the proper time to ignite the charge, and until the engine is sufficiently heated by operating, to ignite its charge by reason of the platinum rod O, which is heated by the burning gases, being sufficiently heated to permit the spark to be dispensed with. The compression in the combustion chamber of a part of the exhaust gases also diminishes the clearance effect thus increasing the power of the engine.

At each upward movement of the rod C², the oil pump plunger J² is raised, and forces oil upward through check valve I² into the chamber G⁸, and also lifts the valve K′ to permit all oil in said chamber above the level of said valve, to be ejected from said chamber through passage K³ and pipe K, thus preventing any oil from being forced upward into the opening G¹².

The cams D′ and d are constructed to permit both valves B⁶ and B⁸ to remain closed when the roller D⁵ is in the position illustrated in Fig. 4, and opens the valve B⁸ when raised by the cam d and opens the air inlet valve when it rests on the lower surface d—d, during which period air is flowing into cylinder B′ and the piston B⁴ is making its suction stroke, as will be readily understood.

It will be seen that a definite volume of air is delivered to the combustion chamber by the air compressor, at each stroke of the piston therein, and that all of the air used in operating the engine, as well as all of the oil or fuel, is delivered after the power piston has completed its upward stroke, so that the only clearance is that represented by the cubic area of the combustion chamber, the power that would be used ordinarily in compressing the fuel charge in the power cylinder, being used to compress the air in the air compressor cylinder, where the air can be drawn in, in a more condensed form due to the cylinder being colder than the power cylinder, and, therefore, a larger volume of air can be forced into the power cylinder than could be drawn in by suction direct; and, further, the air compressor cylinder may vary in its cubic capacity from that of the power cylinder so that more or less air may be forced to the power cylinder, as may be desired, either by increasing the stroke or area of the compressor relative to that of the power cylinder, as will be readily understood.

It will be seen that the fuel may be burned at any desired pressure that the construction may be designed for, without danger of pre-ignition and other such troubles found in the ordinary two and four cycle engines, and that by reason of the high pressures at which the fuel may be generated, the heat generated by the combustion of the fuel may be sufficiently high to perfectly burn the fuel and thereby overcome the troubles inherent in other oil burning engines, such as carbon deposits, tar distillation, etc.

The construction is self-contained and compact, and very simple, and may be operated at a high rotational speed.

It is obvious that a plurality of sets of cylinders may be constructed and united to form generators of increased power if desired.

I claim as new:

1. The method of operating an internal combustion engine consisting of introducing into the power cylinder a stream of liquid fuel mixed with air and surrounding said mixture with a protecting envelop of air and directing said mixture together with its surrounding envelop in the same general direction into an expansion chamber, said mixture and envelop being maintained separate up to their admission into the expansion chamber, the envelop of air surrounding the stream of the fuel mixture and preventing the same from contacting the walls of the cylinder.

2. The method of operating an internal combustion engine consisting in introducing into the power cylinder under pressure all the air used in the combustion of the fuel after the piston has completed the exhaust stroke, mixing a portion of the air with an oil spray and surrounding the mixture with an envelop of air, the mixture and the surrounding envelop being introduced simultaneously in the same general direction into an expansion chamber, the mixture being burned simultaneously with its introduction into the cylinder during a predetermined portion of the power stroke of the piston.

3. The method of operating an internal combustion engine consisting in introducing under pressure, all the air used in the combustion of the fuel, into the power cylinder of the engine after the piston therein has completed its exhaust stroke, and causing a portion of said air to flow into said cylinder in an annular stream and surround a column of sprayed oil which is simultaneously injected into said cylinder, and continuing to inject said oil and air into said cylinder during a predetermined portion of the power stroke of said piston, and burning said oil throughout said portion of the power stroke, then cutting off the supply of air and oil and permitting the gases to expand until the piston has about completed its stroke, then exhausting most of said burned gases from the cylinder during the exhaust stroke of said piston and compressing same into a space adjacent the fuel inlet to the cylinder, and after the piston has completed its exhaust stroke, introducing a new charge of fuel into said compressed burned gases.

4. In an internal combustion engine, the combination of an air compressor cylinder and a power cylinder, a piston in each of said cylinders, a main shaft, two cranks mounted thereon, one of which drives said piston in the air compressor cylinder, and one of which is connected to the piston in said power cylinder, the crank driving said power piston being set in advance of the crank driving said air compressor piston a predetermined degree on said main shaft, a passage leading from said air compressor cylinder to said power cylinder, a valve controlling said passage, means for operating said valve to open same when the piston in the power cylinder has completed its exhaust stroke, an oil pump, means for operating said oil pump, an oil chamber, means for maintaining the oil therein at a predetermined height, a spray nozzle in open communication therewith and supplied therefrom, and means for causing the oil to be carried therefrom into the power cylinder at the same time and during the time that air is delivered from said air compressor cylinder to said power cylinder.

5. The method of operating an internal combustion engine consisting in spraying oil and air under pressure directly into the power cylinder and simultaneously introducing into the power cylinder under pressure and in the same general direction as the fuel an envelop of air surrounding the mixture, the diameter of the envelop being less than the opening into which this envelop with the inclosed charge are admitted, the mixture and the envelop being maintained separate up to their admission into the cylinder and kept separate by the simultaneous expansion of the two, the mixture being gradually burned during its admission for a predetermined travel of the power piston.

6. In an internal combustion engine, a power cylinder, a spraying nozzle for oil, an air nozzle surrounding said oil spraying nozzle and adapted to cause the air to intimately mix with the oil spray, and an annular air passage surrounding said oil and air nozzles, and adapted to cause the air passing therethrough to form a substantially cylindrical envelop to surround said mixture, an expansion chamber into which the mixture and surrounding envelop enter simultaneously, the mixture and envelop being kept separate up to their point of entrance into the expansion chamber, and means for regulating the flow of air through said annular passage.

7. In an internal combustion engine, a source of air pressure supply, an air chamber terminating in a nozzle, and connected to said air supply, an annular passage surrounding said chamber and communicating therewith, a liquid fuel nozzle within said chamber, a fuel chamber communicating with said nozzle, and a duct leading from said air chamber to said fuel chamber, the compressed air being adapted to be forced into the power cylinder through the nozzle and annular passage, and to force the fuel through the fuel nozzle by the pressure exerted upon the liquid in the fuel chamber.

Signed at New York city, in the county of New York, and State of New York, this 18th day of May, 1910.

OTTO KRAUS.

Witnesses:
 FRANK M. ASHLEY,
 GEORGE DOAN RUSSELL.